C. HUNNICUTT.
DROPPING ATTACHMENT FOR CORN PLANTERS.
APPLICATION FILED JULY 19, 1909.

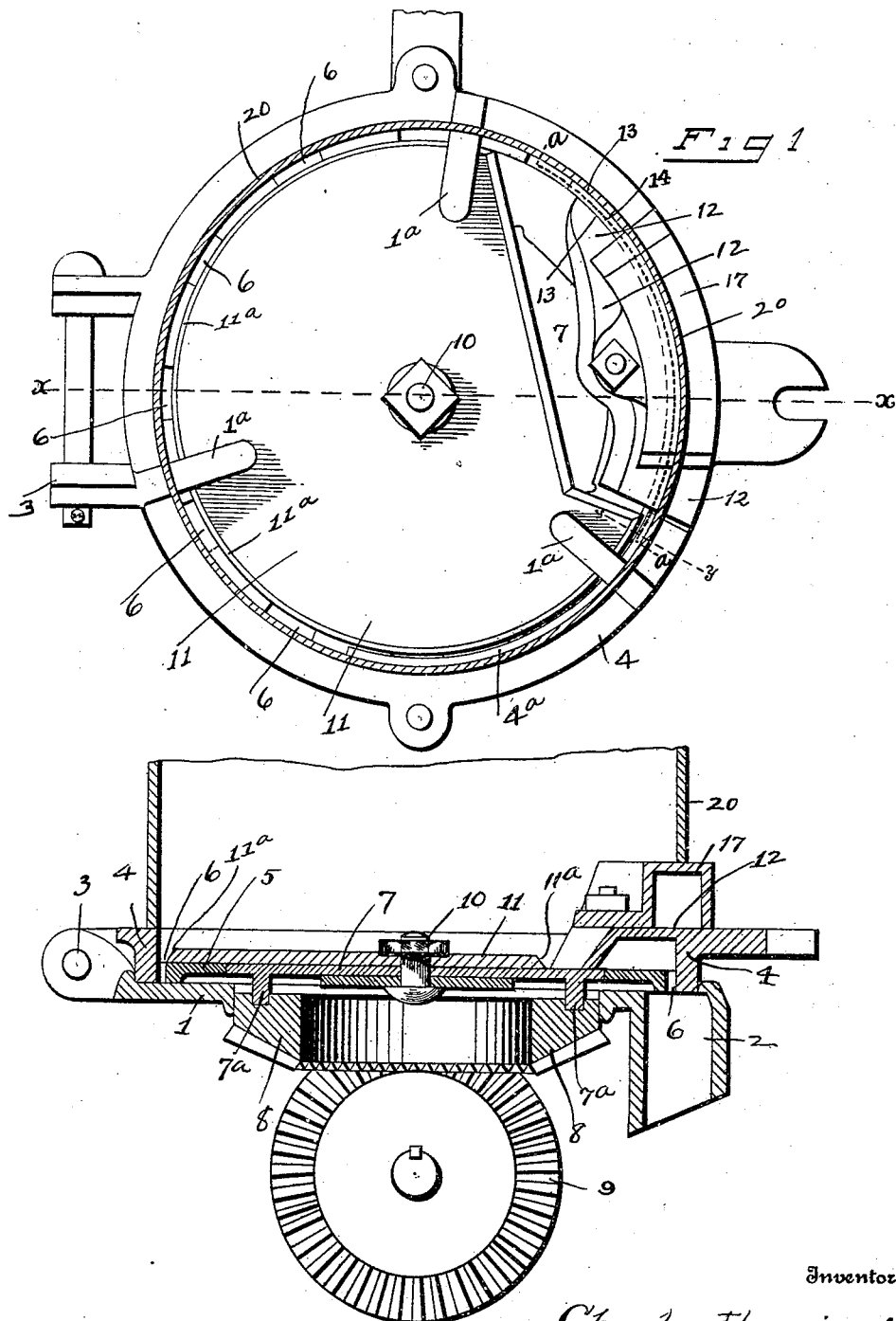

955,462.

Patented Apr. 19, 1910.

2 SHEETS—SHEET 2.

Witnesses
D. E. Beattie
A. L. Phelps

Inventor
Charles Hunnicutt

By
C. C. Shepherd
Attorney

UNITED STATES PATENT OFFICE.

CHARLES HUNNICUTT, OF WILMINGTON, OHIO.

DROPPING ATTACHMENT FOR CORN-PLANTERS.

955,462.  Specification of Letters Patent.  Patented Apr. 19, 1910.

Application filed July 19, 1909. Serial No. 508,393.

*To all whom it may concern:*

Be it known that I, CHARLES HUNNICUTT, a citizen of the United States, residing at Wilmington, in the county of Clinton and State of Ohio, have invented certain new and useful Improvements in Dropping Attachments for Corn-Planters, of which the following is a specification.

My invention relates to the improvement of corn dropping attachments for corn planters, and the objects of my invention are to provide an improved corn discharging mechanism wherein means are provided for preventing the discharge of more than a predetermined number of grains of corn at one time; to provide means for depositing the grains of corn longitudinally within the ring plate recesses; to provide improved means for permitting the passage of unusually large grains of corn to the discharge spout and to produce other improvements the details of which will be more fully pointed out hereinafter.

Figure 3:
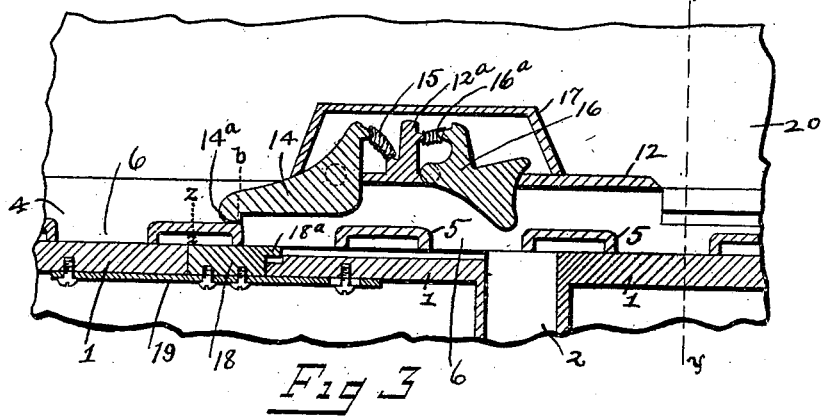
Figure 4:
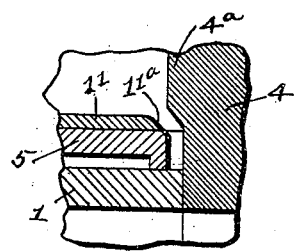
Figure 5:
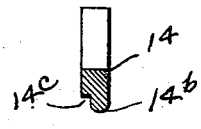

These objects I accomplish in the manner illustrated in the accompanying drawings, in which:

Figure 1 is a transverse section through the hopper or corn containing box of a corn planter showing the box bottom in plan, Fig. 2 is a sectional view on line $x$—$x$ of Fig. 1, Fig. 3 is a sectional view on the curved line $a$—$a$, of Fig. 1, Fig. 4 is an enlarged detail sectional view on line $y$—$y$ of Fig. 1, and, Fig. 5 is an enlarged vertical section through the outer end portion of a spring actuated dog, which I employ in the manner hereinafter described, said section being taken on line $b$ of Fig. 3.

Similar numerals refer to similar parts throughout the several views.

1 represents the usual bottom plate of a planter hopper, which bottom plate is formed with the usual central opening and adjoining one edge with a downwardly extending discharge spout 2, with which discharge spout is ordinarily connected the corn conducting housing which connects with the planter shoe. To the bottom plate 1 is hinged in the usual manner at 3, to the upper side frame ring 4, said ring bearing upon the member 1 in the usual manner. Upon the bottom frame member 1 and within the ring frame 4, is rotatably mounted the corn carrying ring 5, the marginal portion of the ring having formed therein at desirable intervals slightly elongated corn receiving recesses 6. This corn carrying ring is carried by a frame plate or disk 7 which fits within said ring and is suitably connected therewith. This disk has formed on its underside downwardly extending lugs 7ª, which engage the upper side or face of a horizontally disposed bevel gear wheel 8 which extends rotatably within the central opening of the frame member 1 and the teeth of which mesh with the usual upright power transmitting bevel gear wheel 9, which receives its motion from the traveling movement of the corn planter in the ordinary manner.

Through the medium of a bolt 10, which passes centrally and pivotally through the plate or disk 7, said plate is connected with a horizontally disposed upper side plate 11, this plate 11 being in the nature of a partial disk or disk plate having one side cut away, as shown more clearly in Fig. 1. The plate 11 is through the medium of upwardly bowed arms 1ª rigidly connected at suitable intervals with the upper side of the member 4. As shown in the drawing, the greater portion of the plate 11 extends to the outer circular edge of the ring plate 5, the edge of the plate 11, however, being beveled or inclined, as indicated at 11ª. Above that portion of the base ring plate 1, which is provided with the outlet 2, the ring member 4 has formed therewith an inwardly projecting and thence downwardly inclined segmental flange 12, said flange having one of its ends cut away on its inner side, forming a curved recess 13 between said flange and the inner wall of the member 4. This recess which is immediately above and in circular alinement with the notched marginal portion of the plate ring 5, has lying therein a correspondingly shaped dog or trip member 14, the inner enlarged end of which is fulcrumed or pivoted in the plate 12. The outer end of the dog 14 is formed with a rounded termination as indicated at 14ª, the downward extension of which as is indicated more clearly in Fig. 5 of the drawing, is reduced in width, said reduced portion which is indicated at 14ᵇ being of such thickness or width as to permit of its projecting freely within the marginal recesses 6 of the plate 5, when the latter is being rotated, the shoulder 14ᶜ which is formed by producing the reduced terminal 14ᵇ serving to prevent the entrance of the thicker or wider portion of the dog into said recesses. The dog is normally held in frictional contact with the upper surface of the marginal and recessed portion of the ring 5 by means of a spring 15, which is arranged between the upper portion of the inner end of the dog 14 and a projection of a central lug 12ª of the plate 12.

On the opposite side of the lug 12ª from that occupied by the dog 14, I pivot in the plate 12 a spring actuated dog or valve 16, the latter having an upper arm between which and the lug 12ª is interposed a coiled spring 16ª. As indicated in the drawing, the downwardly extending lower portion of the spring actuated dog 16 normally projects below the plate 12 and above the corn outlet 2. The flange 12 is surmounted by an elongated cap 17 which forms a housing for the dog 16 and a portion of the dog 14. Below and opposite the outer end of the dog 14, in the ring 1, which ring forms a floor for the recessed portion of the corn carrying plate 5, is provided a lateral recess which is filled by a comparatively short yielding section 18, the latter being normally held in place within the recess by suitable yielding means such as a spring strip 19, which is secured to the underside of said yielding section, as shown in Fig. 3, and to the underside of said ring body. The section 18 has one end formed with an upper side tongue extension 18ª which engages a correspondingly shaped recess in the upper side of the ring plate, which serves to limit the downward movement of the yielding section. The spring strip 19 serves to normally support the upper side of the section 18 flush with the upper surface of the ring 1.

On the inner side of the ring member 4, I provide a lateral enlargement or projection 4ª, this enlargement extending from a point near one end of the plate 12 a suitable distance about the inner side of said ring member 4. The lower side of the enlargement 4ª is approximately parallel with the corn carrying plate 5 and spaced from it sufficiently to permit the passage of grains of corn horizontally into the recesses of the corn carrying plate. Rising from the ring 4 in the usual manner, is a desirable form of seed corn containing hopper, a portion of which is indicated at 20.

In operation, it will be understood that through the connection of the plate 7 and gear member 8 and the connection of said plate with the ring member 5, rotary motion is imparted to the latter, with the result that the corn which is carried in the hopper and which drops into the marginal recesses 6 of the plate ring 5, is carried in the usual manner to the discharge opening 2, from which after a predetermined number of grains have been deposited therein, the corn is discharged in a suitable manner to the planter shoe. It is desirable in order to deliver a predetermined number of grains of corn to the outlet, that but one grain of corn be carried by each of the elongated recesses of the traveling carrier ring 5, and while the recesses in the plate 5 are constructed of proper size to accommodate horizontally therein grains of average width, and while it is obvious that the dog 14 will by the usual operation, tend to prevent an undesirable number of grains from passing into the space beneath the flange 12, it is well known that occasionally more than one grain of corn will be received by one of the carrier ring recesses, particularly where two grains of considerable less than normal width fall therein and also where two grains fall therein vertically instead of horizontally and where two grains of corn are thus carried by one recess, it is not desirable for the same to pass beneath the dog 14, thus delivering a greater number of grains to the discharge outlet within a given time than is desired, but by providing the projection or enlargement 4ª of the member 4, grains of corn are permitted to enter the recesses of the corn carrying plate 5 only when said grains are in their lengthwise positions, thus insuring the kernel of corn being received lengthwise or longitudinally within the recesses of the ring plate 5 and obviating any tendency of two or more grains being crowded vertically into one of said recesses. When two grains of less than normal width, fall into one of the recesses one above the other and are carried around to the cut-off or dog 14, it will be understood that the reduced terminal portion of the dog which projects or extends into the recess slightly, will serve by contact with the upper grain, to force the latter out of the recess, thus allowing but one grain to pass as desired. As the cut-off or dog 14 is held with considerable pressure in contact with the corn carrying ring plate 5, to permit the passage beneath said dog of comparatively large or wide kernels without injury thereto, or without their being dislodged from the recess, I provide the yielding floor section 18 which will yield sufficiently to permit of the passage of such grain without interference or injury thereto. As in other mechanism of this class, the spring actuated dog 16 serves to direct the grains of corn to the discharge outlet 2 and is sufficiently yielding to overcome any tendency of the corn to become clogged between the same and the entrance to the outlet.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a dropping attachment for corn planters, the combination with a fixed frame ring, of a rotative corn carrying plate having a plurality of peripheral recesses, an inwardly extending flange overhanging said corn carrying plate, a fixed member carried by said flange, a pair of dogs pivotally mounted upon said flange, a spring bearing between each of said dogs and said fixed member, said springs normally tending to force said dogs into engagement with the corn carried by the corn carrying plate, a yielding floor section located beneath one of said dogs, and an outlet located beneath the other of said dogs.

2. In a dropping attachment for corn planters, a rotatably mounted corn carrying plate having recesses formed at intervals in its marginal portion, of a spring actuated dog pivoted above said corn carrying plate, said dog having its outer and lower terminal portion formed with an extension narrower than the body of the dog and narrower than said plate recesses, the reduced terminal portion of said dog adapted to drop into said recesses as the corn carrying plate is rotated.

3. In a dropping attachment for corn planters, the combination with a base member and a ring frame member, of a rotatably mounted corn carrying plate above said base member and having marginal recesses, said ring frame member having a portion of its inner surface provided with a lateral projection or enlargement extending from the point of entry around toward the point of discharge of the grains of corn and inward over the marginal recesses of the corn carrying plate, and spaced above said plate sufficient to permit the entrance laterally of grains of corn into the recesses of the same.

In testimony whereof I affix my signature in presence of two witnesses.

CHARLES HUNNICUTT.

Witnesses:
H. G. CARTWRIGHT,
JOE T. DOAN.